United States Patent
Andreasson et al.

(10) Patent No.: US 8,254,972 B2
(45) Date of Patent: Aug. 28, 2012

(54) DEVICE AND METHOD FOR HANDLING MESSAGES

(75) Inventors: Måns Folke Markus Andreasson, Lund (SE); Henrik Bengtsson, Lund (SE); Erik Johan Vendel Backlund, Gantofta (SE); Johan Apelqvist, Hjärup (SE)

(73) Assignee: Sony Mobile Communications AB, Lund (SE)

( * ) Notice: Subject to any disclaimer, the term of this patent is extended or adjusted under 35 U.S.C. 154(b) by 679 days.

(21) Appl. No.: 12/370,771

(22) Filed: Feb. 13, 2009

(65) Prior Publication Data

US 2010/0210244 A1   Aug. 19, 2010

(51) Int. Cl.
*H04W 4/00* (2009.01)
(52) U.S. Cl. .............. 455/466; 455/412.1; 455/412.2; 455/422.1; 709/238
(58) Field of Classification Search .............. 455/411, 455/412.2, 466; 709/238–244
See application file for complete search history.

(56) References Cited

U.S. PATENT DOCUMENTS

| | | | |
|---|---|---|---|
| 6,549,773 B1 | 4/2003 | Linden et al. | |
| 2002/0007392 A1 | 1/2002 | Buddhikot et al. | |
| 2005/0166153 A1 | 7/2005 | Eytchison et al. | |
| 2007/0055749 A1 | 3/2007 | Chien | |
| 2008/0101278 A1 | 5/2008 | Bengtsson et al. | |
| 2008/0132218 A1 | 6/2008 | Samson et al. | |
| 2009/0221307 A1* | 9/2009 | Wolak et al. | 455/466 |

FOREIGN PATENT DOCUMENTS

| | | |
|---|---|---|
| WO | 2007/031708 | 3/2007 |
| WO | 2007/131540 A1 | 11/2007 |

OTHER PUBLICATIONS

International Preliminary Report on Patentability of corresponding International Application No. PCT/IB2009/006538, dated May 6, 2011.
International Search Report and Written Opinion of corresponding International Application No. PCT/IB2009/006538, dated Jan. 25, 2010.

* cited by examiner

*Primary Examiner* — Ajit Patel
*Assistant Examiner* — Julio Perez
(74) *Attorney, Agent, or Firm* — Renner, Otto, Boisselle & Sklar, LLP

(57) ABSTRACT

A device, method and system for handling received messages on a portable electronic device. The device includes a message handling section 12 to handle or route messages on the mobile device based upon whether the message is addressed to a port number assigned to an application on the mobile device. If the destination port number is not addressed to a port that is assigned to an application on the mobile device, and the message includes a link, then the message is opened automatically in a browser. Optionally, the link may be opened if the destination port number is within a range of port numbers or after requesting permission to open the message from the message recipient.

20 Claims, 3 Drawing Sheets

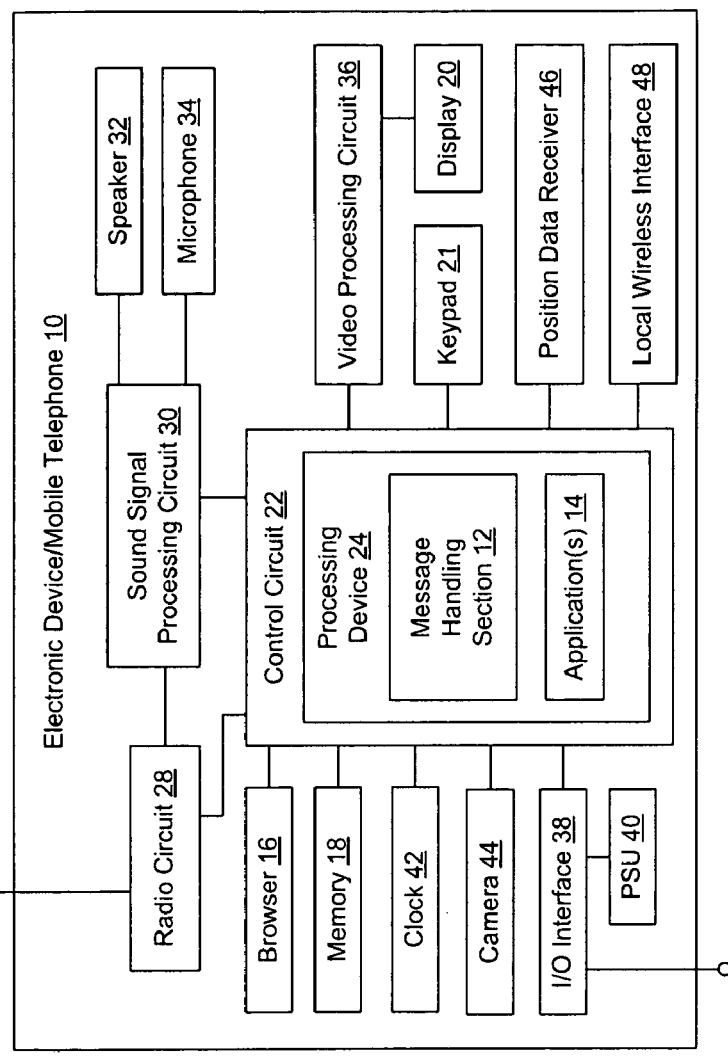
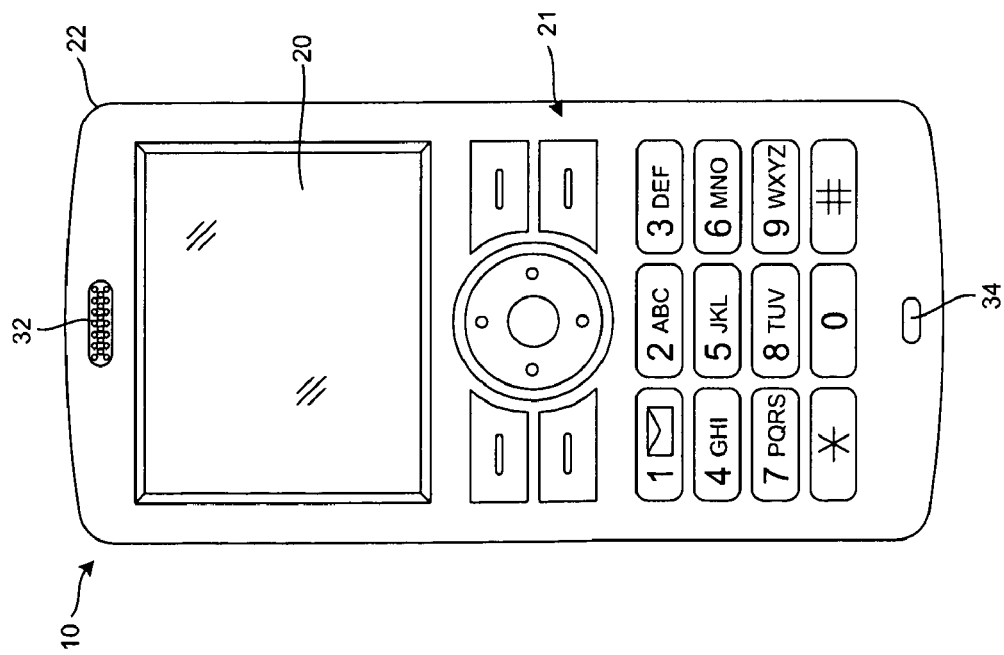
FIG. 2
FIG. 1

DEVICE AND METHOD FOR HANDLING MESSAGES

TECHNICAL FIELD OF THE INVENTION

The technology of the present disclosure relates generally to portable communication devices, and more particularly to a device and method by which a portable communication device handles received messages.

BACKGROUND

Portable electronic devices, such as mobile telephones, media players, personal digital assistants (PDAs), and others, are ever increasing in popularity. To avoid having to carry multiple devices, portable electronic devices are now being configured to provide a wide variety of functions. For example, in addition to being used for making and receiving telephone calls, a mobile telephone also may be used as a camera, an Internet browser for accessing news and information, an audiovisual media player, a messaging device (text, audio, and/or visual messages), a gaming device, a personal organizer, etc.

Additionally, portable communication devices may have the ability to access network-based applications over the Internet or another network. Exemplary network-based applications include email services, instant messaging (IM) services, entertainment services, news and information services, and many others. Portable communication devices are capable of sending and receiving messages intended for use with network-based applications. Typically, such messages include a link, for example, a hyperlink or Uniform Resource Locator (also referred to as a "URL").

SUMMARY

Messages intended for network-based applications may be sent with simple message service ("SMS"). SMS messages typically are received in a message inbox. The message generally must include human-readable text to allow the recipient to know the subject matter of the message and the type of application to which it relates. This format, however, may not be suitable for links to some network-based applications. Additionally, once an SMS message is directed to the inbox, a user may accidentally forward the message to another device, which may be undesirable because the message may include confidential or private information intended for the specific network-based application. After the message intended for a network-based application is directed to the inbox, the operation of the application automatically stops. The user must then manually select the link in the message to restart the intended application.

SMS messages have a maximum length of 160 characters. The link or URL included in the message count against the 160 character limit. Thus, the inclusion of a link in a message limits the amount of space for providing a personalized message and/or instructions to the message recipient. This length limit is particularly pronounced for messages that contain an especially long URL.

To improve the consumer experience with electronic devices, there is a need in the art for an improved method and device for handling messages.

As described in more detail below, a device and method of handling a message are disclosed. According to one aspect of the invention, a method of handling a message with a mobile device includes receiving a message on the mobile device, the message including a destination port number, determining whether an application on the mobile phone is assigned to the destination port number, and (i) in the event that an application is assigned to the destination port number, opening the message with the application, and (ii) in the event that no application is assigned to the destination port number, determining if the message contains a link and automatically opening the link in a browser.

According to another aspect of the method, the message is an SMS message.

According to another aspect of the method, the link is a URL.

According to another aspect, the method further includes adding a parameter to the URL before automatically opening the link in the browser.

According to another aspect, the method further includes determining if the destination port number is within a range of port numbers, and automatically opening the message in the browser in the event that the destination port number is within a range of port numbers and the message contains a link, or placing the message in the message inbox in the event that the destination port number is not within the range of port numbers.

According to another aspect of the method, the determining if the destination port number is within a range of port number further includes determining if the destination port number is a port number between 16000-16999.

According to another aspect, the method further includes prompting the user for permission before automatically opening the link in the browser.

According to another aspect of the method, the method further includes displaying information related to a sender of the message on a display of the mobile device.

According to another aspect of the method, the link is a link to a network-based application.

According to another aspect of the invention, a mobile device includes a message parser for parsing a data received in a message into a message body and a message header, wherein the message header includes a destination port number, and a message controller configured to (i) direct the message to an application, in the event that the application is assigned to the destination port number, and (ii) determine if the message contains a link and to automatically open the link in a browser in the event that no application is assigned to the destination port number.

According to another aspect, the message is a SMS.

According to another aspect, the link is a URL.

According to another aspect of the mobile device, the message controller is configured to add a parameter to the URL to indicate that the message was automatically opened in the browser.

According to another aspect of the mobile device, the message controller is configured to automatically open the message in the browser if the destination port number is within a range of port numbers and the message includes a link, or to place the message in the message inbox if the destination port number is not within the range of port numbers.

According to another aspect of the mobile device, the range of port numbers is port numbers 16000-16999.

According to another aspect of the mobile device, the message controller is configured to prompt a user for permission before automatically opening the link.

According to another aspect, the mobile device further includes a display, wherein the message controller is configured to display at least part of the message body on a display.

According to another aspect of the mobile device, the link is a link to a network-based application.

According to another aspect of the invention, a system includes a communications network having an application server containing the network-based application, and a user electronic device including: a message parser configured to receive a message and to parse the message into a message header and a message body, wherein the message header includes a destination port number, and a message controller configured to determine whether the destination port number is assigned to an application on the mobile device and to direct the message to the assigned application in the event that an application is assigned to the destination port number and to determine if the message includes a link to a network-based application and to open the link in a browser in the event that no application is assigned to the destination port number.

According to another aspect of the system, the message controller is further configured to determine if the destination port number is indicative of a message from a third-party application, and to automatically open the message in the browser if the message is within the range of port numbers.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

It should be emphasized that the term "comprises/comprising" when used in this specification is taken to specify the presence of stated features, integers, steps or components but does not preclude the presence or addition of one or more other features, integers, steps, components or groups thereof.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 1 is a schematic view of a mobile telephone as an exemplary electronic device for use in accordance with an embodiment of the present invention.

FIG. 2 is a schematic block diagram of operative portions of the mobile telephone of FIG. 1.

DETAILED DESCRIPTION OF EMBODIMENTS

Figure 3:
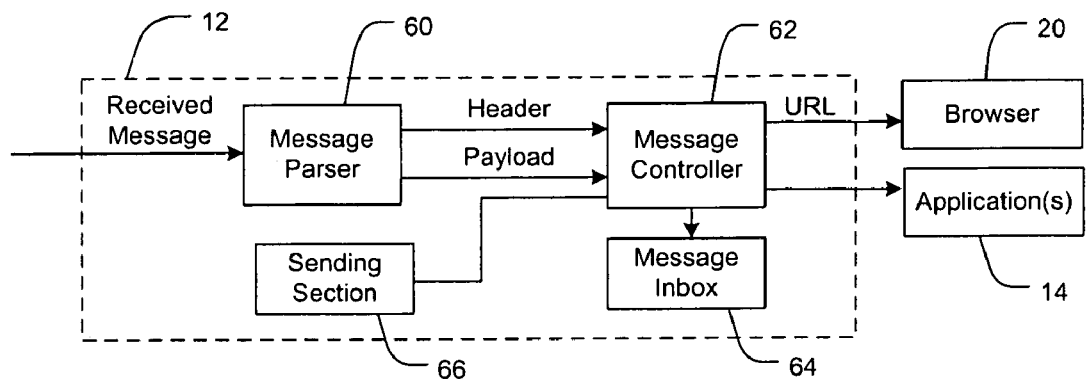
FIG. 3 is a schematic block diagram of a message handling section of the mobile telephone of FIG. 1.

Embodiments are described with reference to the drawings, wherein like reference numerals are used to refer to like elements throughout. It will be understood that the figures are not necessarily to scale.

Referring initially to FIGS. 1 and 2, an exemplary portable electronic device 10 is shown. In accordance with aspects of the present invention, the electronic device 10 is configured with a message handling section 12 to handle or route messages on the mobile device. The message handling section 12 receives each incoming message and determines if the message is addressed to a specific port number (also referred to as a "destination port" or "destination port number"). The message handling section 12 then determines whether the destination port number is assigned to an application 14 on the device 10. If an application 14 is assigned to the destination port, the message is directed or routed to that application. If an application is not registered to the destination port number, then the message handling section 12 determines if the message contains a link, for example, a URL or hyperlink, which may link to a webpage where a network-based application can be accessed and used.

If the message contains a link, the link is automatically opened in the browser 16. The user may then download and install the network-based application or use the application through the browser 16. The message handling section 12 assigns the destination port to the network-based application so that future messages addressed to the destination port are automatically directed to or opened with the network-based application. If the message does not include a link, the message is placed in a message inbox.

Additional details and operation of the message handling section 12 will be described in greater detail below. The message handling section 12 may be embodied as executable code that is resident in and executed by a control circuit in the electronic device 10. In one embodiment, the message handling section 12 may be a program stored on a computer or machine readable medium. The message handling section 12 may be a stand-alone software application or form a part of a software application that carries out additional tasks related to the electronic device 10. The message handling section 12 may be stored in memory 18 and/or in firmware, as discussed below.

The electronic device of the illustrated embodiment is a mobile telephone and will be referred to as the mobile telephone or mobile device 10. The mobile telephone 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

The mobile telephone 10 may include a display 20. The display 20 displays information to a user such as operating state, time, telephone numbers, contact information, various navigational menus, etc., through a graphical user interface (GUI) that enables the user to utilize the various features of the mobile telephone 10. The display 20 also may be used to visually display content received by the mobile telephone 10 and/or retrieved from a memory 18 (FIG. 2) of the mobile telephone 10. The display 20 may be used to present images, video and other graphics to the user, such as photographs, Internet content, text messages, user prompts, etc.

A keypad 21 provides for a variety of user input operations. For example, the keypad 21 typically includes alphanumeric keys for allowing entry of alphanumeric information such as telephone numbers, phone lists, contact information, notes, etc. In addition, the keypad 21 typically includes special function keys such as a "call send" key for initiating or answering a call, and a "call end" key for ending or "hanging up" a call. Special function keys also may include menu navigation and select keys to facilitate navigating through a menu displayed on the display 20. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 20. Also, the display 20 and keypad 21 may be used in conjunction with one another to implement soft key functionality.

The mobile telephone 10 includes call circuitry that enables the mobile telephone 10 to establish a call and/or exchange signals with a called/calling device, typically another mobile telephone or landline telephone. The called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.14 standard), etc. Another example includes a video enabled call that is established over a cellular or alternative network.

The mobile telephone 10 may be configured to transmit, receive and/or process data, such as text messages (e.g., a text message is commonly referred to by some as "an SMS," which stands for simple message service), instant messages, electronic mail messages, multimedia messages (e.g., a multimedia message is commonly referred to by some as "an MMS," which stands for multimedia message service), image files, video files, audio files, ring tones, streaming audio, streaming video, data feeds (including podcasts) and so forth. Processing such data may include storing the data in the memory 18, executing applications to allow user interaction with data, displaying video and/or image content associated with the data, outputting audio sounds associated with the data and so forth.

The mobile phone 10 also may be configured to access network-based applications, also referred to as web-based applications or web applications, which are accessed via a browser 16 through the Internet or another network connection. The network-based application may be coded in a browser supported language such as HTML, Java, JavaScript, and the like. Some network-based applications include webmail, web-based instant messaging, online auctions and online games.

FIG. 2 represents a functional block diagram of the mobile telephone 10. For the sake of brevity, generally conventional features of the mobile telephone 10 will not be described in great detail herein. The mobile telephone 10 includes a primary control circuit 22 that is configured to carry out overall control of the functions and operations of the mobile telephone 10. The control circuit 22 may include a processing device 24, such as a CPU, microcontroller or microprocessor. The processing device 24 executes code stored in a memory (not shown) within the control circuit 22 and/or in a separate memory, such as the memory 18, in order to carry out operation of the mobile telephone 10. The memory 18 may be, for example, one or more of a buffer, a flash memory, a hard drive, a removable media, a volatile memory, a non-volatile memory, a random access memory (RAM), or other suitable device.

The processing device 24 may execute code that implements the message handling section 12 and other application(s) 14 on the mobile device 10. It will be apparent to a person having ordinary skill in the art of computer programming, and specifically in application programming for mobile telephones or other electronic devices, how to program a mobile telephone 10 to operate and carry out logical functions associated with the message handling section 12. Accordingly, details as to specific programming code have been left out for the sake of brevity. Also, while the message handling section 12 is executed by the processing device 24 in accordance with a preferred embodiment of the invention, such functionality could also be carried out via dedicated hardware, firmware, software, or combinations thereof, without departing from the scope of the invention.

Continuing to refer to FIGS. 1 and 2, the mobile telephone 10 includes an antenna 26 coupled to a radio circuit 28. The radio circuit 28 includes a radio frequency transmitter and receiver for transmitting and receiving signals via the antenna 26 as is conventional. The radio circuit 28 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, WiFi, WiMax, DVB-H, ISDB-T, etc., as well as advanced versions of these standards.

The mobile telephone 10 further includes a sound signal processing circuit 30 for processing audio signals transmitted by and received from the radio circuit 28. Coupled to the sound processing circuit 30 are a speaker 32 and a microphone 34 that enable a user to listen and speak via the mobile telephone 10 as is conventional.

The radio circuit 28 and sound processing circuit 30 are each coupled to the control circuit 22 so as to carry out overall operation. Audio data may be passed from the control circuit 22 to the sound signal processing circuit 30 for playback to the user. The audio data may include, for example, audio data from an audio file stored by the memory 18 and retrieved by the control circuit 22, or received audio data such as in the form of streaming audio data from a mobile radio service. The sound processing circuit 30 may include any appropriate buffers, decoders, amplifiers and so forth.

The display 20 may be coupled to the control circuit 22 by a video processing circuit 36 that converts video data to a video signal used to drive the display 20. The video processing circuit 36 may include any appropriate buffers, decoders, video data processors and so forth. The video data may be generated by the control circuit 22, retrieved from a video file that is stored in the memory 18, derived from an incoming video data stream that is received by the radio circuit 30 or obtained by any other suitable method.

The mobile telephone 10 may further include one or more I/O interface(s) 38. The I/O interface(s) 38 may be in the form of typical mobile telephone I/O interfaces and may include one or more electrical connectors. As is typical, the I/O interface(s) 38 may be used to couple the mobile telephone 10 to a battery charger to charge a battery of a power supply unit (PSU) 40 within the mobile telephone 10. In addition, or in the alternative, the I/O interface(s) 38 may serve to connect the mobile telephone 10 to a headset assembly (e.g., a personal handsfree (PHF) device) that has a wired interface with the mobile telephone 10. Further, the I/O interface(s) 38 may serve to connect the mobile telephone 10 to a personal computer or other device via a data cable for the exchange of data. The mobile telephone 10 may receive operating power via the I/O interface(s) 38 when connected to a vehicle power adapter or an electricity outlet power adapter.

The mobile telephone 10 also may include a system clock 42 for clocking the various components of the mobile telephone 10, such as the control circuit 22. The control circuit 22 may, in turn, carry out timing functions, such as timing the durations of calls, generating the content of time and date stamps, and so forth.

The mobile telephone 10 may include a camera 44 for taking digital pictures and/or movies. Image and/or video files corresponding to the pictures and/or movies may be stored in the memory 18. The mobile telephone 10 also may include a position data receiver 46, such as a global positioning system (GPS) receiver, Galileo satellite system receiver or the like.

The mobile telephone 10 also may include a local wireless interface 48, such as an infrared transceiver and/or an RF interface (e.g., a Bluetooth interface), for establishing communication with an accessory, another mobile radio terminal, a computer or another device. For example, the local wireless interface 48 may operatively couple the mobile telephone 10 to a headset assembly (e.g., a personal hands-free device) in an embodiment where the headset assembly has a corresponding wireless interface.

The message handling section 12 is described in greater detail with additional reference to FIG. 3. The message handling section 12 includes a message parser 60, a message controller 62, a message inbox 64, and a sending section 66. The control circuit 22 directs messages, such as SMS messages, received by the mobile device 10 to the message handling section 12, and specifically to the message parser 60.

The message parser 60 receives the message and parses the data in the message into components, such as the message header and the message payload. The message header generally includes information that is used to deliver the message, for example, the destination port, sender information, etc. The message payload generally includes the body of the message, for example, alphanumeric characters or text, an image, a URL, etc. The message parser 60 directs the parsed message, including the message header and the message payload to a message controller 62. Although shown in the illustrated embodiment as a message parser, it will be appreciated that the content of the message may be determined in any conventional manner.

The message controller 62 controls the routing of the message on the mobile device 10, for example, by directing the message to any number of destinations on the mobile device 10. Examples of destinations on the mobile device 10 include any of the application 14 on the device 10, a network-based application, the browser 16, the message inbox 64, etc.

The destination of the message is determined by the message controller 62 based upon the information contained in the message header. Certain programs or application(s) 14 on the mobile device may be assigned or registered to specific port numbers on the mobile device 10. After the destination port for the received message is determined, the message controller 62 determines if the port number is already assigned to an application 14 on the mobile device 10. If the destination port is already assigned to an application 14, then the message is directed to that application. If the destination port is not assigned to an application, then the message controller 62 evaluates the message to determine if it contains a link.

The message controller 62 may determine if the message contains a link by scanning or otherwise evaluating the data in the message for one or a more characters that are indicative of a link. In one embodiment, the message controller 62 may include text recognition or other scanning software to scan the message and to identify strings of alphanumeric characters that are representative of a link. For example, the message controller 62 may scan the message for a string of characters typically included in a URL, e.g., "http", ".com", ".net," "://", or another string of characters that is indicative of a hyperlink.

If the message controller 62 determines that the message includes a link, then the link may be opened automatically in the browser 16, or alternatively, the message controller 62 may prompt the user for permission to open the link in the browser 16. The message controller 62 also may require the user to enter security credential, such as a confirmation code, login, password, or ask a security question to the user. Additionally, the message controller 62 may provide additional information to the user to identify the sender of the message and the destination of the link. For example, such information may include the sender's name, phone number or other contact information, the name of the application, a personalized message, etc.

If the message does not include a link or if the user does not allow the message controller 62 to automatically open the message in the browser 16, then the message controller 62 places the message into the message inbox 64. The user of the mobile device 10 may then open and read the message from the inbox 64, as is conventional. Furthermore, if the message includes a link, the user may manually select the link from the message inbox 64.

The message controller 62 also is configured to assign or to register an application to a port number. For example, if message contains a link to a network-based application, then the message controller 62 is operable to register or assign that destination port to the network-based application. Thus, future messages addressed to that port will be directed automatically to the network-based application.

If the message includes a destination port number, the message controller 62 may be configured to determine whether the destination port number is within a range of port numbers. The message controller 62 may handle the message differently according to whether or not the destination port number is within the range. Such a configuration may be advantageous to avoid assigning the same port number to two different applications or to avoid reassigning a port number from an application on the mobile device to a new application that is distributed or spread through a link in a message.

For example, third party applications may send messages to port numbers 16000-16999. If the destination port of the received message is within the 16000-16999 range, then the message controller 62 knows that the message is intended for a third party application and not an application that may be installed already on the mobile device. The message controller 62 may then determine whether the received message includes a link, as described above. If the destination port is not within the 16000-16999 range, then the message controller may determine that the message is not intended for a new application, and therefore, it may be unnecessary to scan the message for a link. If the port number is not within the range, the message controller 62 may place the received message in the message inbox 64. The 16000-16999 range of port number is exemplary in nature and it will be appreciated that any range of port numbers may used.

As mentioned above, the links to web applications may be received in the message inbox 64 and may be opened by manually selecting and opening the link in the browser 16. The message controller 62 may distinguish between those links that are opened automatically and those links that are manually selected and opened by the user by adding a parameter to the link before opening the link in the browser 16. For example, if link in the message is "http://somewhere.com/downloadApp", a parameter may be added to the message to make the link "http://somewhere.com/downloadApp?redirected=1". Such a parameter indicates to the server that the message was manually selected and opened rather than automatically opened.

The message controller 62 and the sending section 66 are coupled to control the sending of messages from the mobile device 10, as is conventional. The sending section 66 may include functionality related to the addressing of messages, including SMS messages, to other mobile devices. For example, the sending section 66 may add header information to messages before they are sent, including, for example, a destination port number.

Figure 5:
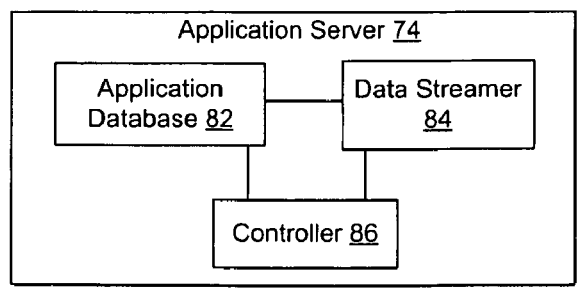
FIG. 5 is a schematic diagram of an exemplary embodiment of an application server in accordance with aspects of the present invention.

With additional reference to FIG. 5, the mobile telephone 10 may be configured to operate as part of a communications system 70. The system 70 may include a communications network 72 having a communications server 74 (or servers) for managing calls placed by and destined to the mobile telephone 10, transmitting data to the mobile telephone 10 and carrying out any other support functions.

The application server 74 is operable to provide information usable by electronic devices (e.g., electronic devices 10, 80) that are coupled to the communication network 70, and may, for example host or provide network-based applications, web-based applications and the like. In addition, the application server 74 may be combined with one or more other servers to provide the functionality described herein.

Figure 4:
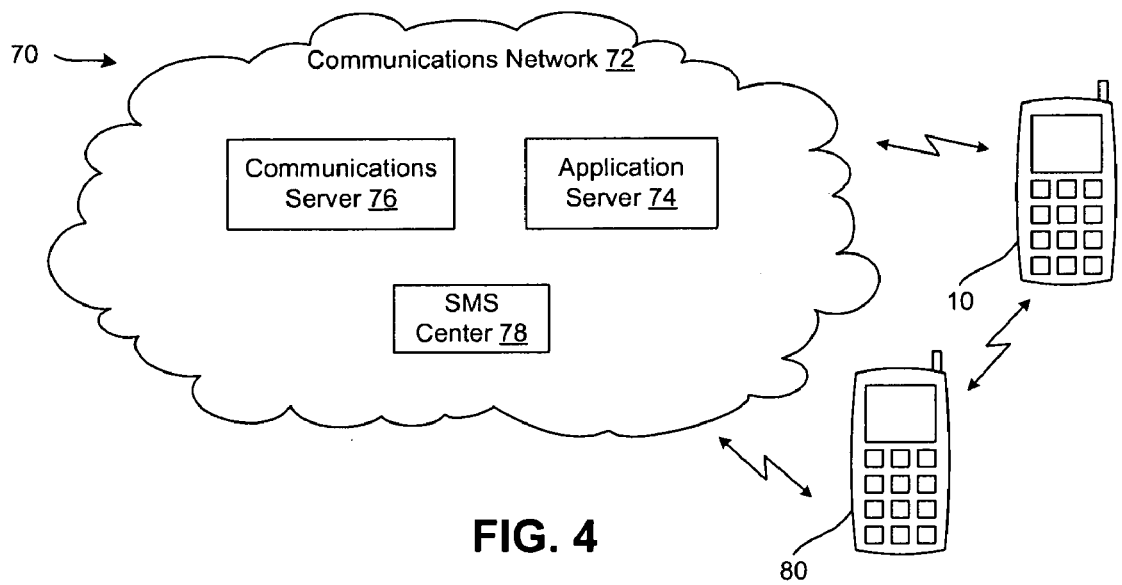
FIG. 4 is a schematic diagram of an exemplary embodiment of a communications system.

With additional reference to FIG. 4, the application server 74 may include an application database 82 for storing files associated with one or more applications. For example, if the application is an entertainment application, the database may contain various media files, or if the application is an email messaging service and/or an instant messaging service, the database may provide storage facilities for users, or code to be executed associated with processing messages. Other applications may be associated with other database types in similar fashion. The application server also may have a data streamer 84 for transmitting data files and information to users as required by the application. The application server also may include a controller 86 for carrying out and coordinating the various functions of the server.

Referring back to FIG. 4, the communications network also includes a short message service center 78 (also referred to as a "SMSC 78") for processing SMS messages sent between users of mobile devices 10, 80 in the communications network 72, as is known in the art. The SMSC 78 routes and delivers text messages to the devices 10, 80 on the communications network 72.

The communications server 74, application server 76, and SMSC 78 communicate with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 70 may support the communications activity of multiple mobile telephones 10 and other types of end user devices. As will be appreciated, the server 72 may be configured as a typical computer system used to carry out server functions and may include a processor configured to execute software containing logical instructions that embody the functions of the server 72 and a memory to store such software.

The network 72 may support the communications activity of multiple mobile telephones 10, 80 and other types of end user devices. As will be appreciated, the servers 74, 76, and 78 may be configured as a typical computer system used to carry out server functions and may include a processor configured to execute software containing logical instructions that embody the functions of the servers 74, 76, 78 and a memory to store such software.

Figure 6:
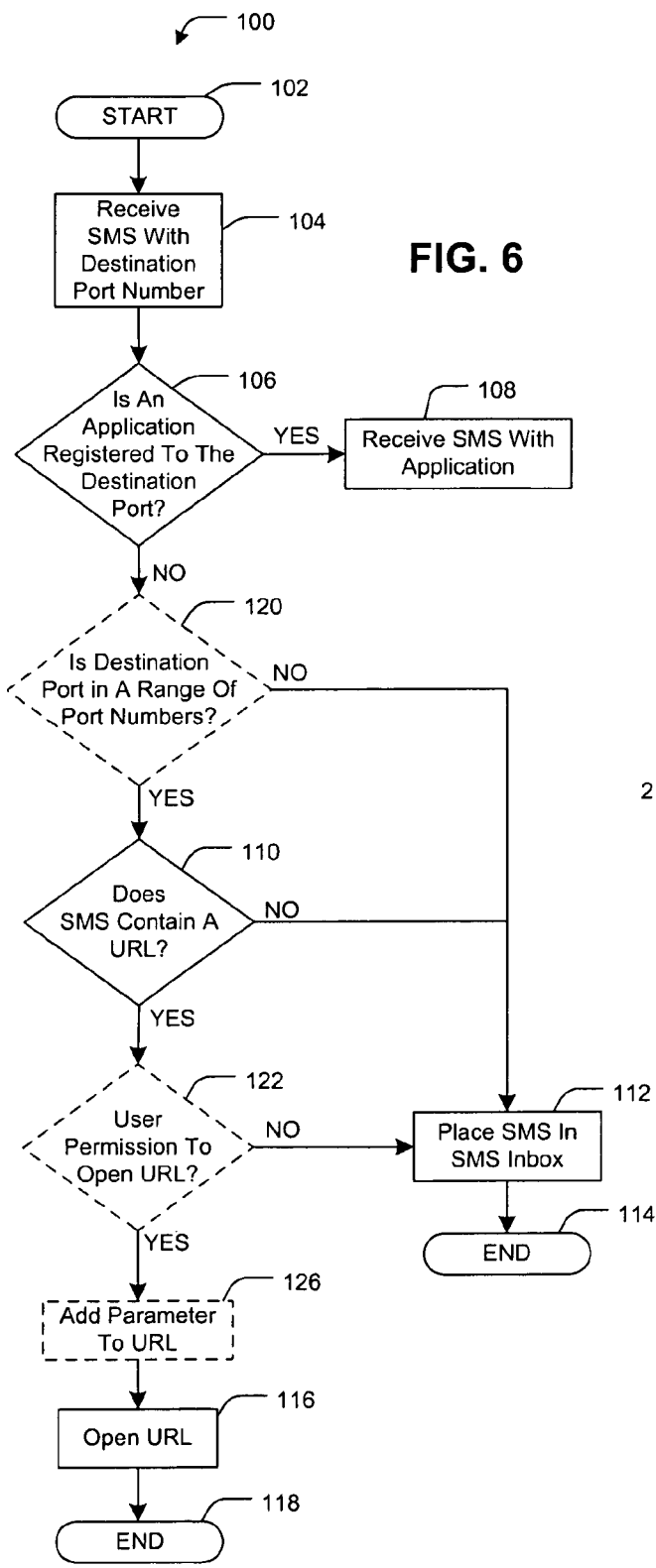
FIG. 6 is a flowchart depicting an exemplary method in accordance with aspects of the present invention.

Referring to FIG. 6, logical operations to implement an exemplary method 100 for handling a message in accordance with the message handling section 12 described above are shown. Additional optional features of the method handling section 12 are shown in dashed lines in the functional block diagram of FIG. 6.

The method of handling a message begins at block 102. At block 104, a message is received by the mobile device 10. In this exemplary embodiment, the message is a SMS message that includes a destination port number.

At block 106, the message handling section 12 determines whether an application 14 is registered to the destination port. If an application is registered to the destination port, then the message is directed by the message handling section 12 to the application that is registered to the destination port. The message handling section 12 may cause the application to open on the mobile device 10, or may "wake" an application that may be running in the background of the device 10. At block 108, the message is received by the registered application.

If the destination port is not registered with an application, the method proceeds to block 110. At block 110, the message handling section 12 determines whether the message includes a link, such as a URL in the message header or message payload, for example. If the message does not contain a link, then the message is placed in the message inbox at block 112 and the process ends at block 114. If the message contains a link, then the method proceeds to block 116 and the link is opened by the browser 16 and the method ends at block 118.

At optional block 120, the message handling section 12 determines whether the destination port is within a range of port numbers. For example, it may be determined whether the destination port is within a range of port numbers assigned or reserved for third party applications, such as port numbers 16000-16999. An advantage to determining whether the destination port number is within the range of port numbers commonly assigned to third party applications is to avoid registering an application to two different applications. Although the above-mentioned range is a range that indicates a third party application, it will be appreciated that any range may be used, regardless of whether the range is indicative of third party applications, or of another type of application. If the destination port number is within the specified range, the method proceeds to block 110 to determine if the message contains a link. If the destination port number is not within the range, the message is placed in the message inbox at block 112 and the method ends at block 114.

Figure 7:
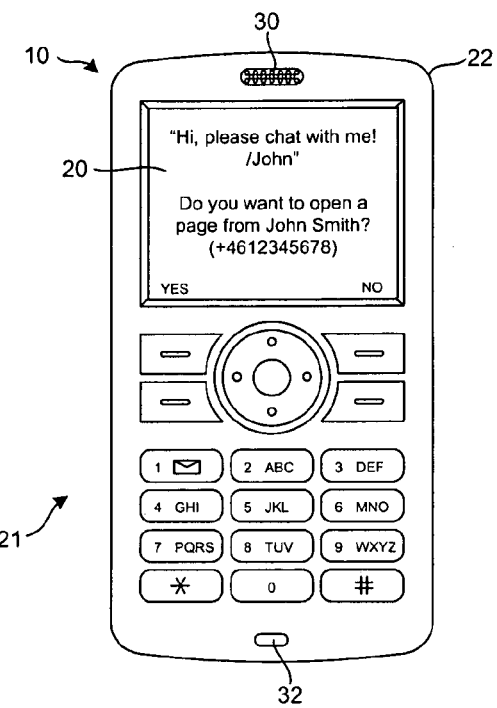
FIG. 7 is a schematic diagram of a mobile telephone in accordance with aspects of the present invention.

At optional block 122, the message handling section 12 may prompt the user and request permission to open the link in the message. An exemplary request for permission to open the link is shown in FIG. 7. The request for permission may be displayed to the recipient on the display 20 of the mobile device 10.

As illustrated in FIG. 7, the request may include a personalized message from the sender. For example, the text may include an invitation to the recipient to open a web-based chat application and the link may include the URL for an application server 74 where the web-based application is hosted. The information included in the request also may include information related to the sender of the message, for example, the sender's name, phone number, email address, screen name, etc. The message also may include instructions to the recipient, for example, how to download or use the application or information related to features or additional functions that may be available through the link in the message. The information may be displayed as a webpage in the browser 16, and may provide information in a user-friendly format.

If the recipient would like to open the link in the browser 16, then "yes" may be selected, and the link may be automatically opened in the browser 16 as shown in block 116. If the recipient does not wish to open the link, then "no" may be selected and the message will placed in the message inbox at block 112 and the method would end at block 114.

According to optional block 126, the message handling section 12 may be configured to add a parameter to the link before opening the link in the browser 16. For example, as described above, a parameter may indicate to the application server 74 that the link was automatically opened or that the link was manually selected and opened by the user from the message inbox 64.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

Although certain embodiments have been shown and described, it is understood that equivalents and modifications falling within the scope of the appended claims will occur to others who are skilled in the art upon the reading and understanding of this specification.

The invention claimed is:

1. A method of handling a message with a mobile device comprising:
   receiving a message on the mobile device, the message including a destination port number;
   determining whether an application on the mobile device is assigned to the destination port number; and
   (i) in the event that an application is assigned to the destination port number, opening the message with the application; and
   (ii) in the event that no application is assigned to the destination port number, determining if the message contains a link and if the message contains a link automatically opening the link in a browser or if the message does not contain a link placing the message in a message inbox.

2. The method of claim 1, wherein the message is an SMS message.

3. The method of claim 1, wherein the link is a URL.

4. The method of claim 3, further comprising adding a parameter to the URL before automatically opening the link in the browser.

5. The method of claim 1, further comprising determining if the destination port number is within a range of port numbers; and
   automatically opening the message in the browser in the event that the destination port number is within a range of port numbers and the message contains a link, or placing the message in the message inbox in the event that the destination port number is not within the range of port numbers.

6. The method of claim 5, wherein determining if the destination port number is within a range of port number further comprises determining if the destination port number is a port number between 16000-16999.

7. The method of claim 1, further comprising prompting a user for permission before automatically opening the link in the browser.

8. The method of claim 7, further comprising displaying information related to a sender of the message on a display of the mobile device.

9. The method of claim 1, wherein the link is a link to a network-based application.

10. A mobile device comprising:
    a message parser for parsing a data received in a message into a message body and a message header, wherein the message header includes a destination port number; and
    a message controller configured to:
    (i) direct the message to an application, in the event that the application is assigned to the destination port number; and
    (ii) determine if the message contains a link and if the message contains a link automatically opening the link in a browser in the event that no application is assigned to the destination port number or if the message does not contain a link placing the message in a message inbox browser in the event that no application is assigned to the destination port number.

11. The mobile device of claim 10, wherein the message is an SMS.

12. The mobile device of claim 10, wherein the link is a URL.

13. The mobile device of claim 12, wherein the message controller is configured to add a parameter to the URL to indicate that the message was automatically opened in the browser.

14. The mobile device of claim 10, wherein the message controller is configured to automatically open the message in the browser if the destination port number is within a range of port numbers and the message includes a link, or to place the message in the message inbox if the destination port number is not within the range of port numbers.

15. The mobile device of claim 14, wherein the range of port numbers is port numbers 16000-16999.

16. The mobile device of claim 10, wherein the message controller is configured to prompt a user for permission before automatically opening the link.

17. The mobile device of claim 16, further comprising a display, wherein the message controller is configured to display at least part of the message body on a display.

18. The mobile device of claim 10, wherein the link is a link to a network-based application.

19. A system comprising:
    a communications network having an application server containing a network-based application; and
    a user electronic device including:
    a message parser configured to receive a message and to parse the message into a message header and a message body, wherein the message header includes a destination port number; and a message controller configured to determine whether the destination port number is assigned to an application on the mobile device and to:
  direct the message to the assigned application in the event that an application is assigned to the destination port number; and
  determine if the message includes a link to a network-based application and if the message contains a link opening the link in a browser in the event that no application is assigned to the destination port number or if the message does not contain a link placing the message in a message inbox in the event that no application is assigned to the destination port number.

20. The system of claim 19, wherein the message controller is further configured to determine if the destination port number is indicative of a message from a third-party application, and to automatically open the message in the browser if the message is within the range of port numbers.

* * * * *